United States Patent [19]

Gellerson

[11] Patent Number: 4,559,865

[45] Date of Patent: Dec. 24, 1985

[54] DEVICE TO TRANSFER MECHANICAL MOTION ACROSS FLUID BARRIER

[75] Inventor: Walter G. Gellerson, Yakima, Wash.

[73] Assignee: Decoto Aircraft Inc., Yakima, Wash.

[21] Appl. No.: 582,005

[22] Filed: Feb. 21, 1984

[51] Int. Cl.[4] .......................... F01B 25/26; F16J 15/32

[52] U.S. Cl. ....................................... 92/5 L; 74/18.1; 92/25

[58] Field of Search .................... 74/18.1; 92/5 L, 24, 92/25

[56] References Cited

U.S. PATENT DOCUMENTS

| | | | |
|---|---|---|---|
| 2,803,222 | 8/1957 | Bukoff | 92/5 L |
| 2,808,810 | 11/1957 | Lindley | 92/5 L |
| 3,003,473 | 10/1961 | Ottoson | 92/5 L |
| 3,087,341 | 4/1963 | Hults | 74/18.1 |
| 3,366,754 | 1/1968 | Hoss et al. | 74/18.1 |
| 3,813,065 | 5/1974 | Hallesy et al. | 92/25 |
| 4,295,413 | 10/1981 | Kamimura | 92/24 |
| 4,470,340 | 9/1984 | Goans et al. | 92/24 |

FOREIGN PATENT DOCUMENTS

| | | | |
|---|---|---|---|
| 90541 | 10/1983 | European Pat. Off. | 92/5 L |
| 411276 | 6/1934 | United Kingdom | 74/18.1 |

*Primary Examiner*—William L. Freeh
*Attorney, Agent, or Firm*—William W. Haefliger

[57] ABSTRACT

A device to provide for mechanical motion between a locking element in a hydraulic actuator to an external indication device, comprises:

(a) a housing defining a first generally longitudinally extensive passage, and a lock element in longitudinal alignment with the first passage, (b) a lever located to pivot in that first passage, the lever having first extent projecting toward the lock element which constrains pivoting of the lever, (c) and structure mounting the lever for such pivoting and defining a fluid barrier, whereby fluid at one side of the barrier closest to said first passage and lock element is isolated from communication with second extent of the lever at the opposite side of the barrier, and whereby motion of the locking element relatively away from the housing relieves said constraint of lever pivoting.

12 Claims, 2 Drawing Figures

DEVICE TO TRANSFER MECHANICAL MOTION ACROSS FLUID BARRIER

BACKGROUND OF THE INVENTION

This invention relates generally to motion transfer devices, and more particularly to devices providing for transfer of mechanical motion between a locking element in a hydraulic actuator to an external indicator means.

There is a need in lockable hydraulic actuators for (a) means to provide for motion out of the enclosed hydraulic actuator to an external indicator thereby to indicate the state of locking and unlocking of the enclosed actuator, and for (b) means to transfer motion into the enclosed actuator and particularly to an enclosed locking element of the actuator, thereby to effect unlocking (for example) of the actuator. In the past, two separate devices were required to solve this problem, adding undesirably to the complexity and risk of malfunction of the overall apparatus. No way was known to eleminate the requirement for such dual devices, and particularly in the novel and unusual manner as is now afforded by the present invention.

SUMMARY OF THE INVENTION

It is a major object of the invention to provide a solution to the above problems and difficulties, and characterized by exceptionally simple and rugged construction, and eliminating the need for the two separate devices, as referred to.

Basically, the improved device comprises:

(a) a housing defining a first generally longitudinally extending passage, and a lock element in longitudinal alignment with said first passage, (b) a lever located to pivot in said first passage, the lever having first extent projecting toward said lock element which constrains pivoting of the lever, (c) and means mounting the lever for said pivoting and defining a fluid barrier, whereby fluid at one side of the barrier closest to said first passage and lock element is isolated from communication with second extent of the lever at the opposite side of said barrier, and whereby sufficient motion of said locking element relatively away from said housing relieves said constraint of lever pivoting.

As will be seen, mechanical motion is transmissible from the locking element, within the hydraulic actuator, through the barrier or containment wall by means of the lever which is rotatable about an axis typically defined by a spherical ball and socket. A single seal is located at the axis of rotation, which prevents loss of the hydraulic fluid medium.

Further the lock element may define a second passage in longitudinal alignment with the first passage; and the lever first extent may project into the second passage which then effects the constraint of lever pivoting. Upon movement of the lock element relatively away from the lever and housing, the lever is freed from the second passage, and its pivoting is then typically constrained only by the housing structure—i.e. a widened mouth of the first passage, so that the lever may then pivot to transfer the desired indicating motion to the exterior.

External mechanical motion is transmissible to the enclosed locking element, thereby to effect lock release, i.e. unlocking the actuator, as by displacing the entire lever housing. The resultant mechanism is, accordingly, smaller and contains fewer components than prior devices.

These and other objects and advantages of the invention, as well as the details of an illustrative embodiment, will be more fully understood, from the following description and drawings, in which:

DRAWING DESCRIPTION

FIG. 1 is a vertical elevation, in section, through a device incorporating the invention, in locked condition; and FIG. 2 is a view like FIG. 1, but showing the device in unlocked conditions

DETAILED DESCRIPTION

Figure 1:
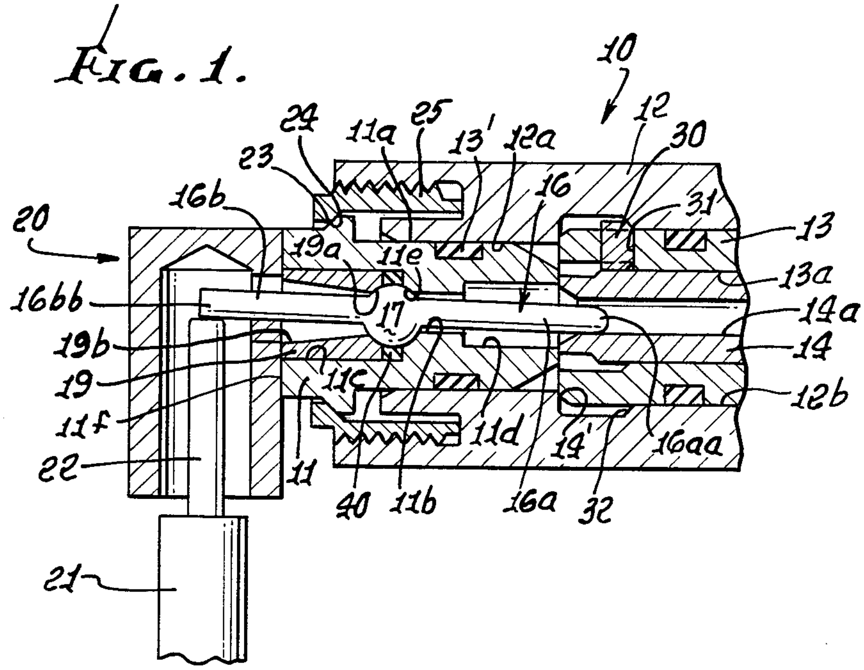
Figure 2:
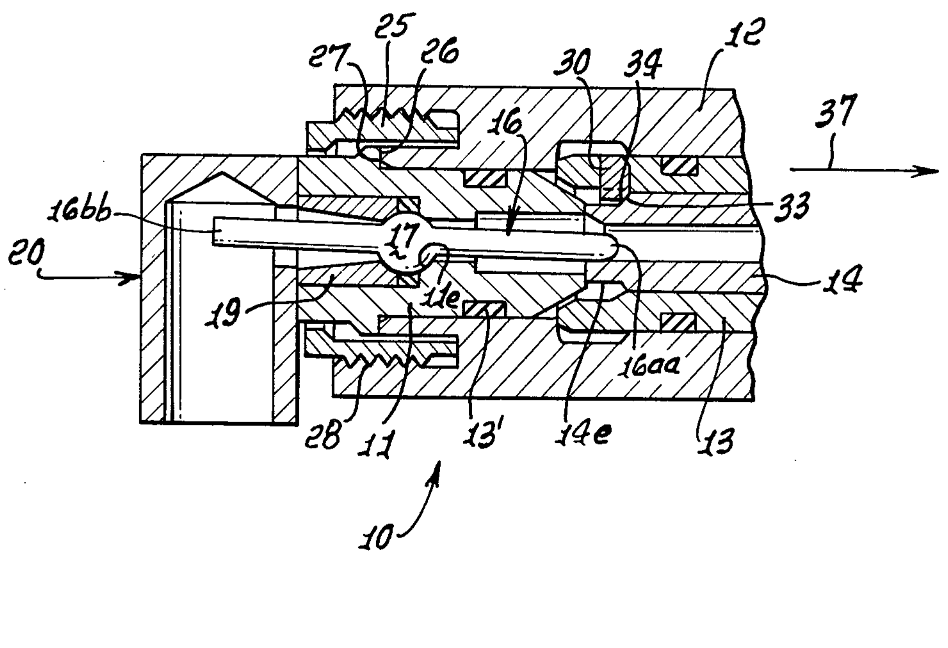

In FIGS. 1 and 2, the device 10 includes a housing 11 slidably received axially and longitudinally endwise rightwardly into the bore 12*a* of a tubular carrier 12. Annular seal 13' carried by the housing seals off between the housing cylindrical outer surface 11*a* and the bore 12*a*. A tubular sleeve member 13 is slidably received axially and longitudinally endwise leftwardly into bore 12*b* of the carrier 12. A tubular lock element 14 is slidably received axially and longitudinally endwise in bore 13*a* of sleeve member 13, the lock element and housing abutting at 14'.

The housing 11 defines a first generally longitudinally extending passage, which is more particularly defined by housing bore 11*b*, and two counterbores 11*c* and 11*d*. Counterbore 11*d* opens at a relatively large mouth toward the lock element, i.e. the diameter (cross-dimension) of counterbore 11*d* is substantially larger than the diameter (cross dimension) of a second longitudinal passage 14*a* in the lock element and in coaxial registration with the first passage counterbore 11*d*. Therefore, the lock element 14 is in longitudinal alignment with the first passage.

A lever 16 is located to pivot in the first passage, the lever having first elongated extent 16*a* projecting in the first passage toward the lock element. In the example, the lever end 16*aa* projects into the smaller diameter second passage 14*a* of the lock element. In that position, the lever is constrained against pivoting beyond a limited extent defined by the bore of the second passage.

Also provided is means mounting the lever for pivoting and also defining a fluid barrier, whereby pressurized hydraulic fluid at one side of the barrier—i.e. fluid in counterbore 11*d* and second passage 14*a* is isolated from communication with second extent 16*b* of the lever at the opposite side of the barrier. In the example, the mounting means or barrier includes a spherical ball pivot 17 integral with the lever, and an annular socket defined by segment surface 11*e* of the housing, and by segment surface 19*a* of annular sleeve 19 fitting in counterbore 11*c*. In addition, an annular seal 40 is received in counterbore 11*c* between surface 11*e* and 19*a*, and engaging the surface of the ball pivot. The bore 19*b* of sleeve 19 flares away from the ball pivot, as shown, to accommodate limited pivoting of lever extent 16*b*. The latter projects leftwardly through the sleeve 19, and into a receptacle 20 engaging the end 11*f* of the housing 11. The end 16*bb* of the lever is operatively connected to an auxiliary indicator 21, as via a suitable link 22, which may exert upward force on lever extent 16*b*, tending to rotate the lever clockwise. When the end 16*aa* is confined in second passage 14*a*, lever pivoting is constrained; however, when the lock element moves relatively away from the lever to free lever end **16*aa*, the lever may pivot clockwise until its rocking movement is again interrupted, as for example by engagement with counterbore 11*d*, whereby indicator 21 senses such lever rocking to indicate that the confined lock element has indeed separated from the end of the housing 11**.

External mechanical motion is transmissible to the locking element, to unlock the actuator, by axially depressing the entire lever housing 11, as via rightward displacement of the receptacle 20 (see FIG. 2). In this regard, mutually interengageable shoulders are carried on the housing 11 and on the cylindrical structure or carrier 12, to limit longitudinal movement of the housing between retracted and advanced position. FIG. 1 shows the housing retracted, with housing shoulder 23 engaging shoulder 24 on a carrier insert 25; and FIG. 2 shows the housing advanced, with housing shoulder 26 engaging shoulder 27 on the carrier. Insert 25 is adjustably threaded into the carrier, as via threads at 28.

The sleeve member 13 in FIG. 1 is shown as locked against longitudinally rightward movement, with both the housing and lock element in retracted position. For this purpose, a keeper 30 is associated with the member 13 and carrier 12 and is displaced radially outwardly in a slot 31 in the member 13 and into a first or outward position holding the member 13 against longitudinally rightward movement relative to the carrier 12.

The keeper may comprise one or more segments located in corresponding slots 31 and spring urged radially inwardly, or it may comprise a split ring, spring urged radially inwardly. In FIG. 1, the keeper engages a shoulder 32 on the carrier 12, to block rightward movement of the sleeve 13; also the lock element blocks radially inward movement of the keeper. Note that the keeper and lock element have cam shoulders 33 and 34 which are mutually engageable when the lock element is moved leftwardly relative to sleeve 12 (and during retraction of the housing 11) to displace the keeper outwardly to the position illustrated in FIG. 1.

When the housing and lock element are displaced rightwardly i.e. advanced as in FIG. 2, the lock element reduced diameter surface **14*e* subtends the keeper, allowing it to spring displace radially inwardly and freeing the sleeve member 13 for rightward movement, as under force application indicated by arrow 37**, thereby also carrying the lock element rightwardly. This motion frees the lever for extreme pivoting, as described above.

I claim:

1. In a device for mechanical motion between a locking element in a hydraulic actuator to an external indication device, the combination comprising (a) a housing defining a first generally longitudinally extensive passage, and a lock element in longitudinal alignment with said first passage, (b) a lever located to pivot in said first passage, the lever having first extent projecting toward said lock element which constrains pivoting of the lever, (c) and means mounting the lever for said pivoting and defining a fluid barrier, whereby fluid at one side of the barrier closest to said first passage and lock element is isolated from communication with second extent of the lever at the opposite side of said barrier, and whereby sufficient motion of said locking element relatively away from said housing relieves said constraint of lever pivoting.

2. The combination of claim 1 wherein said means mounting the lever for pivoting includes a ball pivot integral with the lever, and an annular socket and seal for said ball pivot located between the pivot and an annular internal wall defined by the housing.

3. The combination of claim 1 including auxiliary means operatively connected with said lever second extent to be displaced in response to lever pivoting occurring in response to said motion of the lock element relatively away from the housing.

4. The combination of claim 3 wherein said auxiliary means includes an indicator.

5. The combination of claim 1 wherein the lock element defines a second longitudinal passage in longitudinal registration with said first passage, the lever first extent projecting into said second passage which effects said constraint of lever pivoting.

6. The combination of claim 5 wherein said passage has an enlarged mouth which opens toward said second longitudinal passage, said enlarged mouth having a cross dimension larger than that of said second passage, whereby said lever first extent can pivot within said enlarged mouth, when unconstrained by said second passage, to greater extent than it can pivot within said second passage when constrained thereby.

7. The combination of claim 5 including cylindrical structure defining a bore receiving said housing for limited longitudinal movement therein, and an annular seal between said housing and said bore.

8. The combination of claim 7 including mutually engageable shoulders carried on the housing and on said cylindrical structure to limit said longitudinal movement of the housing between retracted and advanced positions.

9. The combination of claim 8 including a sleeve member locked against longitudinal movement when said housing is in said retracted position, and said lock element is also in a retracted position.

10. The combination of claim 9 including a keeper associated with said sleeve member and cylindrical structure and displaced by said lock element into a first position holding said member against longitudinal movement relative to said cylindrical structure when said lock element is in said retracted position.

11. The combination of claim 10 wherein said keeper comprises a split ring carried by said sleeve member, the keeper and said lock element having cam shoulders which are mutually engageable when said lock element is moved longitudinally to said retracted position, and relative to said sleeve member, thereby to place the keeper into locking position holding the sleeve member against advancement.

12. In a device to provide for mechanical motion between a locking element in an actuator to an external indication device, the combination comprising (a) a housing defining a first generally longitudinally extensive passage, and a lock element in longitudinal alignment with said first passage, (b) a lever located to pivot in said first passage, the lever having first extent projecting toward said lock element which constrains pivoting of the lever, (c) and means mounting the lever for said pivoting and defining a barrier, whereby one side of the barrier closest to said first passage and lock element is isolated from communication with second extent of the lever at the opposite side of said barrier, and whereby sufficient motion of said locking element relatively away from said housing relieves said constraint of lever pivoting.

* * * * *